United States Patent [19]
Tolfsen

[11] Patent Number: 6,073,785
[45] Date of Patent: Jun. 13, 2000

[54] CONTAINER DISPENSING APPARATUS

[75] Inventor: Ulf Tolfsen, Gamle Fredrikstad, Norway

[73] Assignee: Norcool A.S., Borgenhaugen, Norway

[21] Appl. No.: 09/038,920

[22] Filed: Mar. 12, 1998

[30] Foreign Application Priority Data

Apr. 1, 1997 [NO] Norway .................................. 971464

[51] Int. Cl.⁷ ...................................................... A47F 1/06
[52] U.S. Cl. ............................. 211/183; 211/59.2; 211/74
[58] Field of Search ............................ 211/59.2, 74, 183, 211/162; 221/299, 301, 312 R

[56] References Cited

U.S. PATENT DOCUMENTS

| | | | |
|---|---|---|---|
| 2,071,771 | 2/1937 | Shield | 221/301 |
| 2,270,908 | 1/1942 | Smith | 221/301 |
| 2,620,691 | 12/1952 | Gould | 211/59.2 |
| 2,772,787 | 12/1956 | Lee | 211/74 |
| 3,034,684 | 5/1962 | Jackson | 221/301 |
| 3,243,220 | 3/1966 | Karas | 211/74 |
| 4,022,363 | 5/1977 | Eliassen | 211/74 |
| 4,235,351 | 11/1980 | Kolbl et al. | 221/301 |
| 4,300,704 | 11/1981 | Funke et al. | 221/301 |
| 4,310,097 | 1/1982 | Merl . | |
| 4,367,818 | 1/1983 | Suttles . | |
| 4,401,221 | 8/1983 | Suttles | 211/59.2 |
| 4,423,816 | 1/1984 | Suttles | 211/59.2 |
| 4,526,097 | 7/1985 | Cound | 221/301 |
| 4,592,377 | 6/1986 | Paulsen et al. | 211/301 |
| 5,000,393 | 3/1991 | Madsen | 221/301 |
| 5,209,358 | 5/1993 | Simard | 211/74 |
| 5,533,632 | 7/1996 | Patterson et al. | 211/162 |
| 5,586,665 | 12/1996 | Brousseau . | |
| 5,586,687 | 12/1996 | Spamer et al. | 211/59.2 |
| 5,669,527 | 9/1997 | Hardy | 211/74 |
| 5,695,074 | 12/1997 | Wiese | 211/59.2 |
| 5,706,956 | 1/1998 | Headrick et al. | 211/59.2 |
| 5,706,957 | 1/1998 | Hardy | 211/59.2 |
| 5,718,341 | 2/1998 | Robertson | 211/59.2 |
| 5,788,091 | 8/1998 | Robertson et al. | 211/59.2 |

FOREIGN PATENT DOCUMENTS

| | | | |
|---|---|---|---|
| 370165 | 6/1923 | Germany | 211/74 |
| 4925 | 3/1892 | United Kingdom | 211/74 |

*Primary Examiner*—Daniel P. Stodola
*Assistant Examiner*—Jennifer E. Novosad
*Attorney, Agent, or Firm*—Austin R. Miller

[57] ABSTRACT

A dispenser for bottles, suspendable via a collar portion in guides on the dispenser, running toward a discharge opening, and having at the discharge opening a stop mechanism with a rocker arm which is spring-tensioned or shaft-mounted, and mounted in a housing and having a longitudinal edge portion forming a spring-loaded contact with the top portion of the container and a flat portion of the rocker arm forming an upper limiting face for the top of the collar portion where the longitudinal portion of the rocker arm has a forward area having an indentation and a rear area which forms an arresting element, and where the stop mechanism also has a front portion having a downwardly and backwardly oriented guide slot for the collar, the guide slot at the rear terminating in an undercut portion.

7 Claims, 4 Drawing Sheets

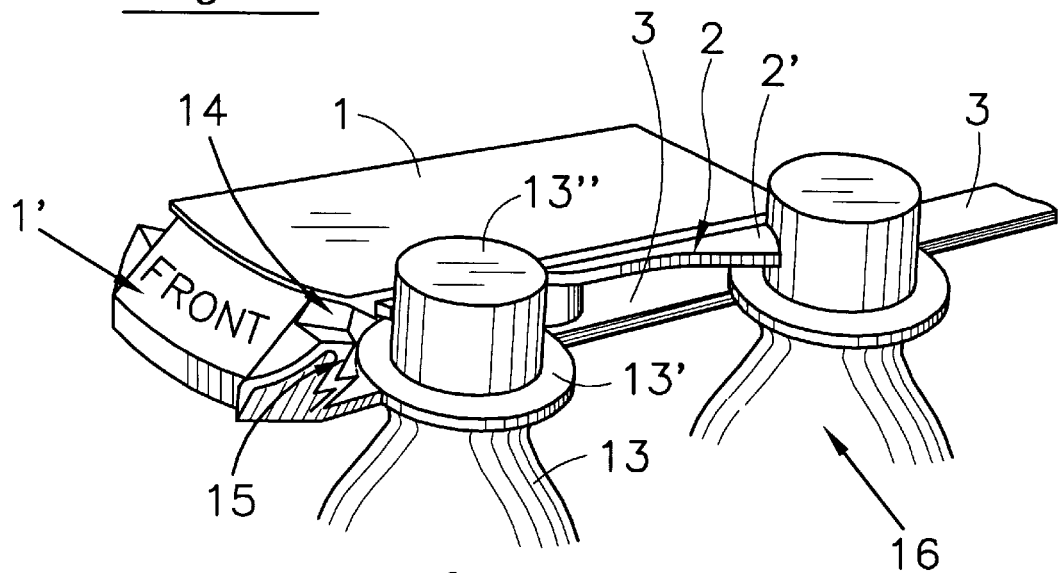
Fig. 1
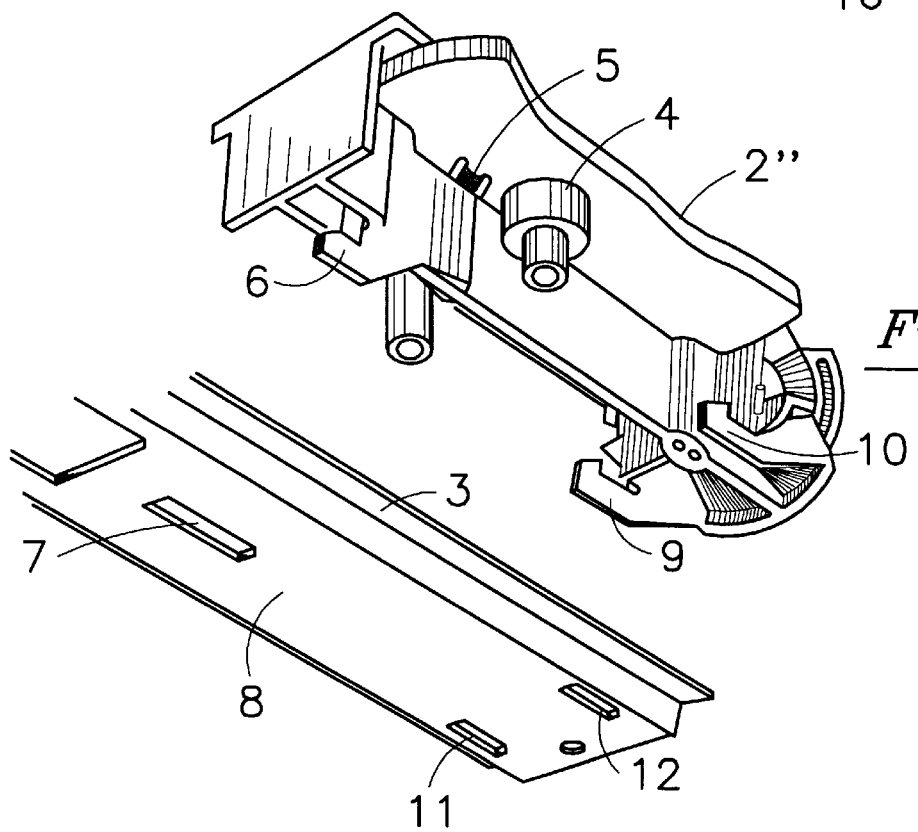
Fig. 2
Fig. 3

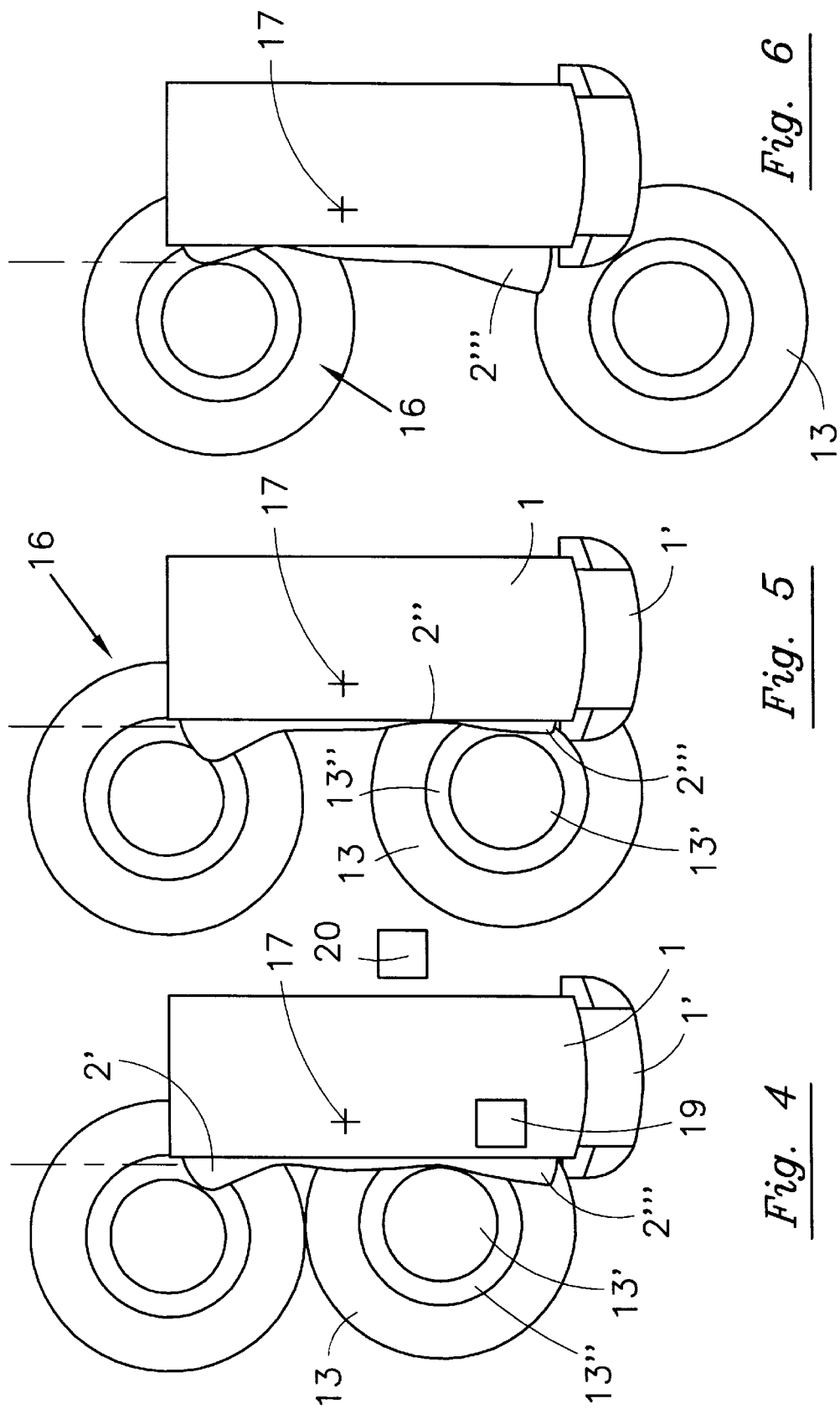

CONTAINER DISPENSING APPARATUS

The present invention relates to a dispensing apparatus or dispenser, for containers, e.g., bottles, which are suspendable via a collar portion on the container positioned in guides extending a discharge opening, and wherein a container stop means is located at the discharge opening. Furthermore, the invention relates to the use of the dispensing apparatus.

There are few similar systems on the market today. Some manufacturers supply systems based on stop means at the end of the guides, and most common of these in use is a straightforward turned-up flange or an incision in the guides. The weakness of such solutions is that all the containers, such as bottles, suspended behind the forwardmost container press with great force against the forwardmost container which is the next to be taken out. The person operating the dispenser not only sees that there is great friction present and that thus a great force is required to release a container, such as a bottle. Also the container, because of the pressure, slants outward towards a door, such as the door in a refrigerated compartment. That the container is in such a slanted position is unacceptable. Where the container is a bottle, some solutions are based on this principle with the addition of guiding the forwardmost bottle vertically by manoeuvring the bottle cap, but a solution of this kind presents itself as both a clumsy and ponderous design, and consequently of little aesthetic appeal since such designs often block the view of the bottles at the back.

The object of the present invention is to overcome a number of the problems associated with the prior art. One particular object of the dispensing device is that it can be used in refrigerated compartments, such as, refrigerators for soft drinks. The dispensing device is primarily, but not solely, designed for bottles, especially PET bottles, which can hang by the neck in suitable guides having sufficient incline for the bottles to slide forward towards the door opening. A forward feed is thus provided by means of the force of gravity.

A further object of the dispensing device according to the invention is to stop plural containers from "running out" of the dispensing device. Specifically, this means an assurance that the forwardmost container hangs vertically by means of proper guiding, and that the container therebehind brakes and maintains a distance sufficient to ensure that pressure from the rest of the containers does not push the forwardmost container even further forward.

A further object of the dispensing device according to the invention is to guide the forwardmost container, such as a bottle, so that it is presented in a comfortable manner and easy to grip and remove from the guides. An additional object is that the dispensing device will be capable of preventing containers or bottles behind the forwardmost container from jumping out.

Conversely, the dispensing device is also capable to serve as an insertion device for containers.

The characteristic features of the inventive dispensing device and the use thereof are set forth in the appended patent claims, and also in the following description with reference to the appended drawings which illustrate preferred embodiments.

FIG. 1 is a perspective view which shows the dispensing device according to the invention.

FIG. 2 is a perspective view of the arresting means which is a part of the dispensing device, from below and behind.

FIG. 3 is a perspective view which shows a rail which forms a bottom cover for the arresting means, seen from below and behind.

FIGS. 4, 5, and 6 are schematic drawings which show the function of the dispensing device.

Figure 7:
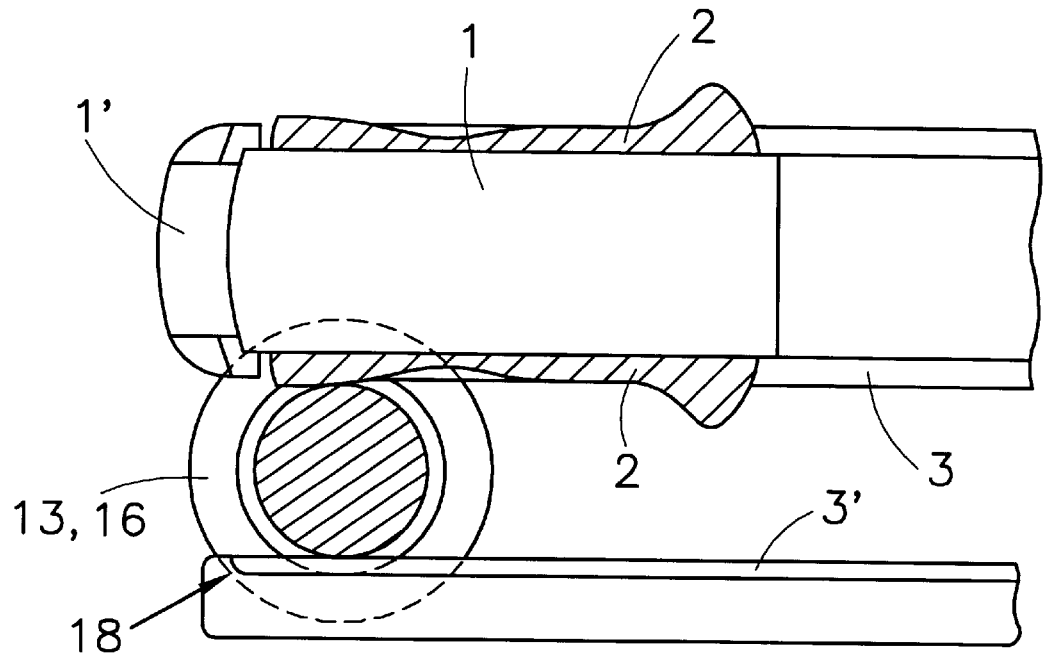
Figure 8:
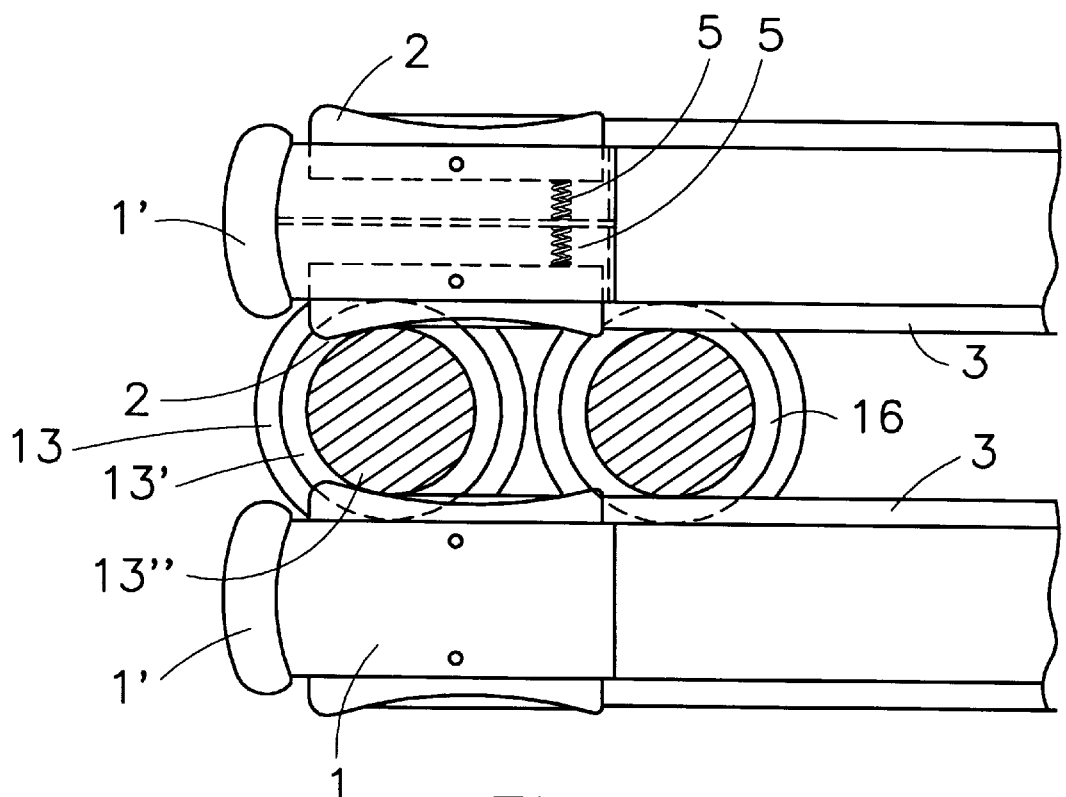

FIGS. 7 and 8 show two alternative embodiments of the device, according to the invention.

Figure 9:
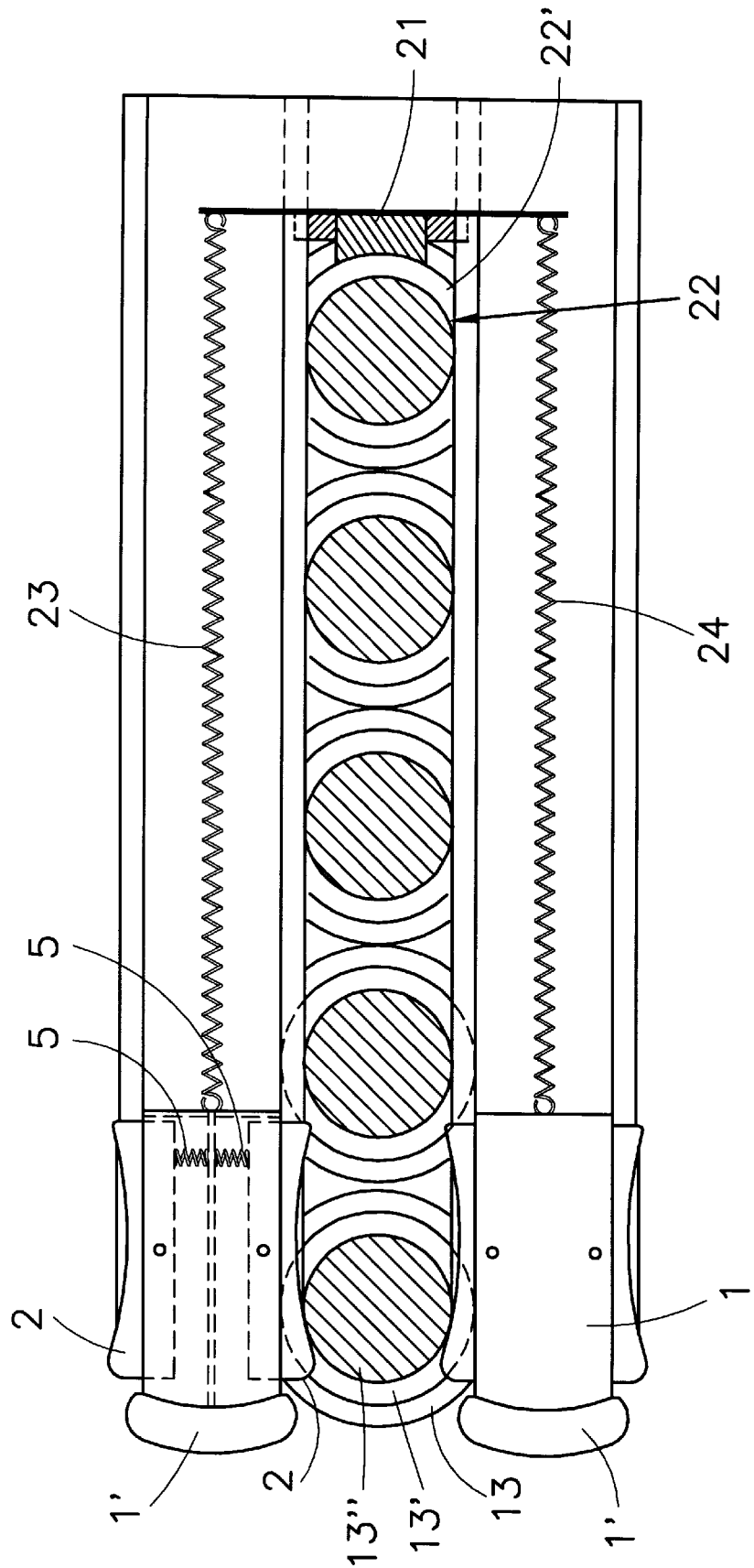

FIG. 9 shows a modification of the device in FIGS. 7 and 8.

Turning now to FIGS. 1–3, the dispensing device consists of an arresting means housing 1 which has a rocker arm 2. The rocker arm 2 is pivotally mounted on the housing 1 and is held above an inclined guide 3 by means of a spacer sleeve 4 (FIG. 2). The rocker arm 2 is spring-tensioned by means of a spring 5 (FIG. 2). The spring 5 presses the rear part of the rocker arm 2 substantially horizontally outward, as will be seen immediately when looking at FIGS. 2 and 8. The arresting means, with its rocker arm 2, distance sleeve 4 and spring 5 mounted in the housing 1, can be attached to the guide or rail 3 by being pushed in from in front. The projection 6 at the rear portion of the arresting means engages with a recess 7 on the cover 8 formed by the guide or rail 3. Parallel with this, grips 9, 10 on the front underside of the housing 1 grip underneath the front part of the bottom part or cover 8 and snap into holes 11, 12. In principle, the members 6, 7, 9, 11 and 10, 12 could be replaced by screw connections, but at a considerably higher price.

The invention will now be described further in connection with a container in the form of a bottle, especially a light-weight bottle of PET material. Such bottles 13 have a characteristic collar 13' (FIG. 1) and are provided uppermost with a removable screw cap 13".

When the dispensing device is to be loaded with bottles 13, each bottle 13 with its characteristic collar is fed aslant from the front into a slot or groove 14 in the housing 1 of the arresting means. This front portion is adapted to the profile of the bottle 13 and consequently guides the bottle and the collar into the guides 3. Once well past the slot or groove 14, the bottle 13 can be released. It then slides on the guide or rail 3 towards an undercut groove 15 and stops thereagainst. This groove 15 is provided to prevent bottles next in sequence from sliding out when the forwardmost bottle is discharged. The remaining bottles can then be fed in successively. The bottles are allowed to pass arresting element 2' on the rocker arm, in that the rocker arm 2 can move out slightly towards the bottle cap 13" because of a concave portion or indentation 2" on the lateral edge of the rocker arm. The distance between the arresting element 2' and the concave portion or indentation 2" is adapted to the diameter of the bottles and the centre distance on insertion. In this way, the insertion of the bottles 13 can be carried out with just one hand, and without holding the successive bottles or forcing the first of these past the arresting element 2' and the rocker arm 2.

The locked position is characterised in that the cap 13" on the outermost bottle 13, i.e., the bottle which is closest to the front 1' of the arresting means, squeezes the rocker arm 2 inwardly. The arresting element 2' is thereby pressed out and thus prevents the adjacent bottle, indicated here for the sake of simplicity by means of the reference numeral 16, from slipping forward. In this connection reference is not only made to FIG. 1, but also to FIGS. 4 and 5. Consequently, the bottle 16 also arrest the bottles next in sequence (not shown). The pressure from these bottles next in sequence, normally six to seven such bottles, will inevitably press the bottle 16 forward because the guides or rails 3 form a gentle incline downward towards the front portion 1' of the arresting means. Owing to the distance to the forwardmost bottle 13, this bottle will not be affected by the adjacent bottle 16, since this is arrested by means of the arresting element 2', and the bottle 13 will thus hang "nicely" and substantially vertically.

Discharge from the dispensing device takes place when the bottle which is closest to the front 1' of the arresting means 1 is lifted out forwardly at the bottom edge and pulled out via the slot or groove 14. The pressure from the next bottle in sequence, indicated by means of reference numeral 16, against the arresting element 2' will now overcome the moderate spring force and press the arresting element 2' inwards in the housing 1. As will be seen from FIG. 6 there is at that stage no bottle 13 which, at the front portion of the arresting means, now blocks a front edge 2''' of the rocker arm 2, thereby allowing the arresting element 2' to be pushed in as mentioned. The bottle indicated by means of the reference numeral 16 will now slide forward and cause the rocker arm to once more assume a locking position, as shown in FIGS. 4 and 5. The discharge process can be repeated until all the bottles in the dispensing device have been discharged.

FIG. 7 shows how the dispensing device may be provided with an arresting means housing 1 with its front portion 1', rocker arms 2 and guide rail 3. On the opposite side of the path of movement of the bottle 13; 16 there is provided a guide rail 3' which serves as a guide for the collar on the opposite side of the bottle. In the alternative in FIG. 8, there are provided two side-by-side arresting means with housing 1, front portion 1' and accompanying rail-like guides 3, thereby allowing locking of the next bottle in sequence on both sides thereof. In a normal refrigerator or refrigerated cabinet there will be a certain number of dispensing devices. If the refrigerator is viewed from in front, the right-hand side, for example, of a row of shelves will start with half a rail having a passive check groove 3' wherein the passive check groove 3' at a front portion thereof may be designed like the guide groove 14 with the undercut groove 15 as shown in FIG. 1. For the sake of simplicity this is indicated by means of the reference numeral 18 in FIG. 7. On the left-hand side of the cabinet, seen from in front, there will be a mirror-image arrangement. A conceivable alternative solution is shown in FIG. 8, where a rocker arm 2 will be capable of engaging against both sides of the bottle.

The present invention is thus based on locking, either from one side with the aid of a rocker arm 2 which comes to rest against the bottle or container, or with double locking, by using a pair of rocker arms in connection with all the bottle guides.

The present invention is shown and described in connection with lateral locking against the cap 13" of a bottle, but it will be understood that locking can take place against the flange portion 13' of the bottle.

To be able to prevent more than one bottle from being removed from the dispensing device at a time, e.g., in those cases where the dispensing device is to be linked to a payment system, the arresting means is provided with a release mechanism 19 (FIG. 4) which releases the rocker arm 2 so that it can turn about its shaft 17. The release mechanism 19 can be controlled by a code panel, a coin-operated unit 20 or similar. As soon as a bottle, e.g., the bottle 13, has been taken out of the dispensing device, a bottle next in sequence, such as bottle 16, will enter the arresting means and when it reaches the indentation 2" it will block bottle withdrawal, as shown in FIG. 4, until the release mechanism 19 is again released by means of the unit 20.

FIG. 9 shows how the bottles can be driven forward towards the discharge opening by means of a mechanical device which replaces gravity forward feed. A device of this kind may, e.g., consist of a spring mechanism, such as an abutment block 21 which acts against a collar portion 22' of the bottle 22 suspended at the very back bottle and which is drawn by two springs. Of course, other, technically equivalent solutions would be obvious to a person versed in the art.

What is claimed is:

1. A dispensing device for containers wherein the containers are suspended in a path of forward motion via a collar portion on each of said containers in spaced guides positioned on opposite sides of the container, said guides extending toward a discharge opening, and stop means at said discharge opening for stopping a container from unintentionally leaving the dispensing device, wherein said stop means comprises at least one rocker arm, mounted for movement about a rocker arm shaft, where the rocker arm is mounted to move sidewardly back and forth in a plane that is substantially parallel to said slide path;

said rocker arm having a longitudinal edge portion positioned to make contact with a top portion of said container; said rocker arm also having a substantially flat portion which constitutes an upper limiting face for a top face of said collar portion of the container;

the said longitudinal edge portion of said rocker arm having a forward area having an indentation and a rear area which protrude sidewardly into said slide path and an indentation therebetween, said rear area forming a container arresting element; and said stop means also having a front portion that is provided with a guide slot for said collar portion, said guide slot at a rear portion thereof having an undercut portion.

2. A dispensing device as defined in claim 1, wherein the guides are inclined slightly downward and forward toward the front portion of said dispensing device.

3. A device as defined in claim 1, wherein means are provided for urging the containers toward the dispenser discharge opening by aid of a spring.

4. A device as defined in claim 1, wherein the rocker arm is held at a distance above an adjacent guide by means of a distance sleeve which is disposed about said rocker arm shaft.

5. A device as defined in any one of claims 1–4, wherein two rocker arms are used, which come to rest against opposite sides of the container.

6. A device as defined in any one of claims 1–4, wherein the arresting element has a controllable release mechanism.

7. A device as defined in any one of claims 1–4, wherein the rocker arm is movable against tensioning provided by a spring.

\* \* \* \* \*

UNITED STATES PATENT AND TRADEMARK OFFICE
CERTIFICATE OF CORRECTION

PATENT NO. : 6,073,785
DATED : June 13, 2000
INVENTOR(S) : Ulf Tolfsen

It is certified that error appears in the above-identified patent and that said Letters Patent is hereby corrected as shown below:

Kindly substitute the following correct Claim 1 for the Claim 1 now of record:
1. A dispensing device for containers wherein containers are adapted to be suspended in a slide path of forward motion via a collar portion on each of the containers on spaced guides positioned on opposite sides of the container, said guides extending toward a discharge opening, and stop means at said discharge opening for stopping the container from unintentionally leaving the dispensing device, wherein said stop means comprises at least one rocker arm, mounted for movement about a rocker arm shaft, where the rocker arm is mounted to move sidewardly back and forth in a plane that is substantially parallel to said slide path;
said rocker arm having a longitudinal edge portion positioned to make contact with a top portion of the container;
said rocker arm also having a substantially flat portion which constitutes an upper overlapping face for overlapping a top face region of said collar portion of the container;
said longitudinal edge portion of said rocker arm having a forward area and a rear area which protrude sidewardly into said slide path and an indentation therebetween, said rear area forming a container arresting element; and
said stop means also having a front portion that is provided with a guide slot for said collar portion, said guide slot at a rear portion thereof having an undercut portion.

Signed and Sealed this

Twenty-third Day of October, 2001

*Attest:*

*Attesting Officer*

NICHOLAS P. GODICI
*Acting Director of the United States Patent and Trademark Office*